(12) United States Patent
Kwon et al.

(10) Patent No.: US 10,923,772 B2
(45) Date of Patent: Feb. 16, 2021

(54) CABLE-TYPE SECONDARY BATTERY AND METHOD FOR MANUFACTURING THE SAME

(71) Applicant: LG Chem, Ltd., Seoul (KR)

(72) Inventors: Yo-Han Kwon, Daejeon (KR); In-Sung Uhm, Daejeon (KR); Je-Young Kim, Daejeon (KR); Young-Ji Yuk, Daejeon (KR)

(73) Assignee: LG Chem, Ltd.

( * ) Notice: Subject to any disclaimer, the term of this patent is extended or adjusted under 35 U.S.C. 154(b) by 61 days.

(21) Appl. No.: 15/766,997

(22) PCT Filed: Feb. 6, 2017

(86) PCT No.: PCT/KR2017/001299
§ 371 (c)(1),
(2) Date: Apr. 9, 2018

(87) PCT Pub. No.: WO2017/135793
PCT Pub. Date: Aug. 10, 2017

(65) Prior Publication Data
US 2018/0301762 A1  Oct. 18, 2018

(30) Foreign Application Priority Data
Feb. 5, 2016 (KR) .................. 10-2016-0015239

(51) Int. Cl.
*H01M 10/0587* (2010.01)
*H01M 4/13* (2010.01)
(Continued)

(52) U.S. Cl.
CPC ......... *H01M 10/0587* (2013.01); *H01M 2/02* (2013.01); *H01M 2/34* (2013.01);
(Continued)

(58) Field of Classification Search
None
See application file for complete search history.

(56) References Cited

U.S. PATENT DOCUMENTS

2003/0068560 A1  4/2003  Izumi et al.
2007/0224502 A1*  9/2007  Affinito .............. H01M 4/385
429/209
(Continued)

FOREIGN PATENT DOCUMENTS

CN  104025339 A  9/2014
CN  104393324 A  3/2015
(Continued)

OTHER PUBLICATIONS

Search report from International Application No. PCT/KR2017/001299, dated Apr. 18, 2017.
(Continued)

*Primary Examiner* — Daniel S Gatewood
(74) *Attorney, Agent, or Firm* — Lerner, David, Littenberg, Krumholz & Mentlik, LLP

(57) ABSTRACT

The present disclosure provides a cable-type secondary battery which includes: at least one inner electrode; a separation layer formed to surround the outer surface of the inner electrode and configured to prevent a short of the electrodes; a sheet-type outer electrode surrounding the separation layer or the inner electrode and formed by spiral winding; and a polymer electrolyte coating layer formed to surround the sheet-type outer electrode, wherein the sheet-type outer electrode is formed by spiral winding to avoid an overlap.

19 Claims, 5 Drawing Sheets

(51) Int. Cl.
*H01M 4/75* (2006.01)
*H01M 2/02* (2006.01)
*H01M 10/058* (2010.01)
*H01M 4/62* (2006.01)
*H01M 10/056* (2010.01)
*H01M 2/34* (2006.01)
*H01M 10/0565* (2010.01)

(52) U.S. Cl.
CPC ............... *H01M 4/13* (2013.01); *H01M 4/62* (2013.01); *H01M 4/75* (2013.01); *H01M 10/056* (2013.01); *H01M 10/058* (2013.01); *H01M 10/0565* (2013.01); *H01M 2220/30* (2013.01); *H01M 2300/0017* (2013.01); *H01M 2300/0082* (2013.01)

(56) References Cited

U.S. PATENT DOCUMENTS

| | | | |
|---|---|---|---|
| 2013/0078535 | A1 | 3/2013 | Aizawa |
| 2014/0072852 | A1 | 3/2014 | Kwon et al. |
| 2014/0212720 | A1 | 7/2014 | Kwon et al. |
| 2014/0234681 | A1* | 8/2014 | Kwon ................... H01M 4/386 429/94 |
| 2014/0377617 | A1* | 12/2014 | Kwon ................... H01M 4/626 429/94 |
| 2015/0064603 | A1* | 3/2015 | Smithyman .......... G01N 27/223 429/492 |
| 2017/0200979 | A1 | 7/2017 | Kwon et al. |

FOREIGN PATENT DOCUMENTS

| | | |
|---|---|---|
| CN | 204375852 U | 6/2015 |
| EP | 2822085 A1 | 1/2015 |
| JP | 3998446 B2 | 10/2007 |
| JP | 2014519167 A | 8/2014 |
| JP | 2015502012 A | 1/2015 |
| JP | 2015518642 A | 7/2015 |
| KR | 19970072538 A | 11/1997 |
| KR | 20130040159 A | 4/2013 |
| KR | 20130112697 A | 10/2013 |
| KR | 20130122278 A | 11/2013 |
| KR | 20150146433 A | 12/2015 |
| WO | 2015194909 A1 | 12/2015 |

OTHER PUBLICATIONS

Extended European Search Report for Application No. 17747836.9 dated Sep. 20, 2018, 9 pages.

Yo Han Kwon et al: "Cable-Type Flexible Lithium Ion Battery Based on Hollow Multi-Helix Electrodes", Advanced Materials, vol. 24, No. 38, Oct. 2, 2012 (Oct. 2, 2012), pp. 5192-5197, XP055124961, ISSN: 0935-9648. DOI: 10. 1002/adma.201202196 *col. 4' line48-col. 5, line3.

Chinese Search Report for Application No. 201780003435.3 dated Jul. 3, 2020, 1 page.

\* cited by examiner

CABLE-TYPE SECONDARY BATTERY AND METHOD FOR MANUFACTURING THE SAME

CROSS-REFERENCE TO RELATED APPLICATIONS

The present application is a national phase entry under 35 U.S.C § 371 of International Application No. PCT/KR2017/001299, filed Feb. 6, 2017, which claims priority from Korean Patent Application No. 10-2016-0015239 filed on Feb. 5, 2016, in the Republic of Korea, the disclosures of which are incorporated herein by reference.

The present disclosure relates to a freely deformable cable-type secondary battery. More particularly, the present disclosure relates to a cable-type secondary battery which allows easy injection of an electrolyte and a method for manufacturing the same.

BACKGROUND ART

In recent times, a secondary battery refers to a device which converts external electric energy into the form of chemical energy and stores it therein, and then generates electricity as necessary. Such a secondary battery is also called the name of 'rechargeable battery' which means a battery capable of being charged many times. Typical secondary batteries include a lead storage battery, nickel cadmium (Ni—Cd) battery, nickel metal hydride (NiMH) battery, lithium ion (Li-ion) battery and a lithium ion (Li-ion) polymer battery. A secondary battery provides both an economical advantage and an environmental advantage as compared to a disposable primary battery.

Currently, a secondary battery is used for some applications requiring low electric power. For example, such applications include a device that helps starting of a car, portable system, instrument and a no-brake power supply system. Recently, development of wireless communication technology leads popularization of a portable system. In addition, there is a tendency to convert many conventional systems into wireless systems. Under these circumstances, there is an exploding demand for secondary batteries. Further, hybrid cars and electric cars have been commercialized with a view to preventing environmental pollution. Such next-generation vehicles adopt secondary batteries to reduce the cost and weight and to increase the service life.

In general, secondary batteries are generally provided as cylindrical, prismatic or pouch-type batteries. This is because secondary batteries are manufactured by installing an electrode assembly including an anode, cathode and a separator into a cylindrical or prismatic metal can or a pouch-type case made of an aluminum laminate sheet, and then injecting an electrolyte to the electrode assembly. Therefore, a predetermined space for installing a secondary battery is required essentially. Thus, such cylindrical, prismatic or pouch-like shapes of secondary batteries undesirably function as limitations in developing various types of portable systems. As a result, there is a need for a novel type of secondary battery which allows easy deformation.

In this context, a cable-type secondary battery, which has a significantly larger ratio of length to sectional diameter, has been suggested. Many studies have been conducted to apply such cable-type secondary batteries to wearable applications on the user's body or smart fabric. In addition, there is a need for a customized battery suited to such products for supplying electric power thereto. Further, since a cable-type secondary battery uses a polymer electrolyte to form an electrolyte layer, it is difficult to inject an electrolyte to the active material of an electrode. This results in the problems of an increase in resistance of a battery and degradation of capacity characteristics and cycle characteristics.

DISCLOSURE

Technical Problem

The present disclosure is designed to solve the problems of the related art, and therefore the present disclosure is directed to providing a cable-type secondary battery which has a minimized inner diameter so that the cable battery may be provided in a woven form or a plurality of batteries may be connected horizontally to form a sheet-type structure so as to function as a power supply source for smart fabric or wearable applications.

The present disclosure is also directed to facilitating injection of an electrolyte in a cable-type secondary battery having a minimized inner diameter.

Technical Solution

In one aspect of the present disclosure, there is provided a cable-type secondary battery which includes: at least one inner electrode; a separation layer formed to surround the outer surface of the inner electrode and configured to prevent a short of the electrodes; a sheet-type outer electrode surrounding the separation layer or the inner electrode and formed by spiral winding; and a polymer electrolyte coating layer formed to surround the sheet-type outer electrode, wherein the outer electrode includes an outer current collector, an outer electrode active material layer formed on one surface of the outer current collector, and a first support layer formed on the other surface of the outer current collector, and the sheet-type outer electrode is formed by spiral winding to avoid an overlap.

According to a preferred embodiment of the present disclosure, the polymer electrolyte coating layer may include a polar linear polymer, oxide-based linear polymer or a mixture thereof.

According to a more particular embodiment, the polar linear polymer may be any one selected from the group consisting of polyimide, polyacrylonitrile, polyvinyl chloride, polyvinylidene fluoride (PVDF), polyvinylidene fluoride-co-hexafluoropropylene, polyvinylidene fluoride-co-trichloroethylene, polyethylene imine, polymethyl methacrylate, polybutyl acrylate, polyvinylpyrrolidone, polyvinylacetate, polyethylene-co-vinyl acetate, polyarylate, polyurethane and poly-p-phenylene terephthalamide, or a combination thereof. In addition, the oxide-based linear polymer may be any one selected from the group consisting of polyethylene oxide, polypropylene oxide, polyoxymethylene and polydimethylsiloxane, or a combination thereof.

According to another preferred embodiment of the present disclosure, the inner electrode may include at least two wire-type inner electrodes disposed in contact with each other and in parallel with each other, or at least two wire-type inner electrodes twisted with each other.

According to still another preferred embodiment of the present disclosure, the inner electrode may include an inner current collector and an inner electrode active material layer formed on the surface of the inner current collector.

According to still another preferred embodiment of the present disclosure, the sheet-type outer electrode may have a strip structure extended in one direction.

According to still another preferred embodiment of the present disclosure, the sheet-type outer electrode may be formed by spiral winding with an interval of at most two times of the width of the sheet-type outer electrode so as to avoid an overlap.

According to still another preferred embodiment of the present disclosure, the first support layer may be a polymer film.

According to still another preferred embodiment of the present disclosure, the outer electrode may further include a porous second support layer formed on the outer electrode active material layer.

According to still another preferred embodiment of the present disclosure, the cable-type secondary battery may further include a conductive material coating layer including a conductive material and a binder and formed on the second support layer.

According to still another preferred embodiment of the present disclosure, the conductive material coating layer may include the conductive material and the binder mixed with each other at a weight ratio of 80:20-99:1.

According to still another preferred embodiment of the present disclosure, the cable-type secondary battery may further include a porous coating layer including a mixture of inorganic particles with a binder polymer and formed on the second support layer.

According to still another preferred embodiment of the present disclosure, the inner electrode may be an anode or cathode, and the outer electrode may be a cathode or anode corresponding to the inner electrode.

According to yet another preferred embodiment of the present disclosure, the cable-type secondary battery may further include a protective coating formed to surround the outer surface of the polymer electrode coating layer.

In another aspect of the present disclosure, there is also provided a method for manufacturing a cable-type secondary battery, including the steps of: preparing an electrode assembly including at least one inner electrode, a separation layer formed to surround the outer surface of the inner electrode and configured to prevent a short of the electrodes, and a sheet-type outer electrode surrounding the separation layer or the inner electrode and formed by spiral winding, wherein the sheet-type outer electrode is formed by spiral winding to avoid an overlap; dipping the electrode assembly into an electrolyte bath to inject an electrolyte thereto; and coating the outer part of the electrode assembly to which the electrolyte is injected with a polymer to form a polymer coating layer.

According to a preferred embodiment of the present disclosure, the polymer coating layer may include a polar linear polymer, oxide-based linear polymer or a mixture thereof.

According to a more particular embodiment, the polar linear polymer may be any one selected from the group consisting of polyimide, polyacrylonitrile, polyvinyl chloride, polyvinylidene fluoride (PVDF), polyvinylidene fluoride-co-hexafluoropropylene, polyvinylidene fluoride-co-trichloroethylene, polyethylene imine, polymethyl methacrylate, polybutyl acrylate, polyvinylpyrrolidone, polyvinylacetate, polyethylene-co-vinyl acetate, polyarylate, polyurethane and poly-p-phenylene terephthalamide, or a combination thereof. In addition, the oxide-based linear polymer may be any one selected from the group consisting of polyethylene oxide, polypropylene oxide, polyoxymethylene and polydimethylsiloxane, or a combination thereof.

According to another preferred embodiment of the present disclosure, the inner electrode may include at least two wire-type inner electrodes disposed in contact with each other and in parallel with each other, or at least two wire-type inner electrodes twisted with each other.

Advantageous Effects

The cable-type secondary battery according to an embodiment of the present disclosure has a minimized inner diameter so that the cable battery may be provided in a woven form or a plurality of batteries may be connected horizontally to form a sheet-type structure so as to function as a power supply source for smart fabric or wearable applications.

In addition, the cable-type secondary battery according to an embodiment of the present disclosure facilitates injection of an electrolyte in a cable-type secondary battery having a minimized inner diameter, thereby providing a battery with excellent capacity characteristics and cycle characteristics.

Further, the cable-type secondary battery according to an embodiment of the present disclosure may have a support layer introduced to at least one surface of the sheet-type electrode to improve the flexibility of the electrode significantly. In addition, when severe external force is applied to such a degree that the electrode may be folded completely, the support layer may provide a cushioning function even in the absence of an increase in content of a binder in an electrode active material layer, and thus reduces generation of cracking in the electrode active material layer, thereby preventing separation of the electrode active material layer from a current collector. As a result, it is possible to prevent a decrease in capacity of a battery and to improve the cycle life characteristics of a battery. Further, a porous support layer may be provided to facilitate injection of an electrolyte to the electrode active material layer. In this case, the pores of the porous support layer are impregnated with the electrolyte to prevent an increase in resistance in a battery, thereby preventing degradation of the quality of a battery.

DESCRIPTION OF DRAWINGS

The accompanying drawings illustrate preferred embodiments of the present disclosure and together with the following detailed description, serve to provide further understanding of the technical features of the present disclosure, and thus, the present disclosure is not construed as being limited to the drawings.

BEST MODE

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation. Therefore, the description proposed herein is just a preferable example for the purpose of illustrations only, not intended to limit the scope of the disclosure, so it should be understood that other equivalents and modifications could be made thereto without departing from the scope of the disclosure.

In one aspect of the present disclosure, there is provided a cable-type secondary battery which includes: at least one inner electrode; a separation layer formed to surround the outer surface of the inner electrode and configured to prevent a short of the electrodes; a sheet-type outer electrode surrounding the separation layer or the inner electrode and formed by spiral winding; and a polymer electrolyte coating layer formed to surround the sheet-type outer electrode, wherein the outer electrode includes an outer current collector, an outer electrode active material layer formed on one surface of the outer current collector, and a first support layer formed on the other surface of the outer current collector, and the sheet-type outer electrode is formed by spiral winding to avoid an overlap.

Figure 1:
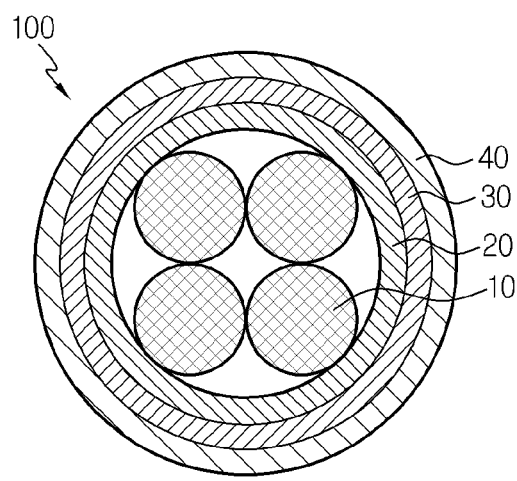
FIG. 1 is a sectional view illustrating the sectional surface of the cable-type secondary battery according to an embodiment of the present disclosure.

Herein, when a plurality of inner electrodes are present as shown in FIG. 1, the inner electrodes are packed closely so that the cable-type battery according to the present disclosure may have a decreased diameter. Such a cable-type battery may have a smaller thickness as compared to the conventional cable-type battery. Thus, the cable-type battery may be provided in a woven form or a plurality of batteries may be connected horizontally to form a sheet-type structure to be introduced to smart fabric or wearable applications.

Herein, when the inner electrodes have a cavity, it is possible to inject an electrode through a needle. However, when the inner electrodes have a closely packed structure without any cavity as described above, it is not easy to inject an electrolyte through a needle. Therefore, according to the present disclosure, there has been studied a method for solving the problem related with injection of an electrolyte in the case of non-hollow inner electrodes, particularly a closely packed structure of non-hollow inner electrodes. For this purpose, the inventors of the present disclosure have designed a method which includes allowing an electrode assembly to pass through an electrolyte bath so that the electrolyte may be absorbed into a battery, and encapsulating the electrode assembly by carrying out polymer coating to prevent the electrolyte from getting out of the battery after dipping the battery into the electrolyte bath. Herein, the electrolyte is absorbed to the polymer electrolyte layer used for the encapsulation, like a polymer electrolyte, and thus the polymer electrolyte layer may have ion conductivity. The cable-type secondary battery obtained by the above-mentioned method can facilitate injection of an electrolyte in a cable-type secondary battery having non-hollow type closely packed inner electrodes.

Hereinafter, configuration of the cable-type secondary battery according to the present disclosure will be explained in more detail.

The polymer electrolyte coating layer is formed to surround the sheet-type outer electrode, i.e., the electrode assembly including the inner electrode and the outer electrode.

According to an embodiment of the electrode assembly of the present disclosure, the electrode assembly includes: at least one inner electrode; a separation layer formed to surround the outer surface of the inner electrode and configured to prevent a short of the electrodes; and a sheet-type like outer electrode surrounding the separation layer or the inner electrode and formed by spiral winding. According to another embodiment of the electrode assembly, a material functioning as a separation layer is stacked on the outer electrode to form a sheet-type separation layer-outer electrode complex, which may be wound spirally so that the inner electrode may be surrounded therewith.

Figure 2:
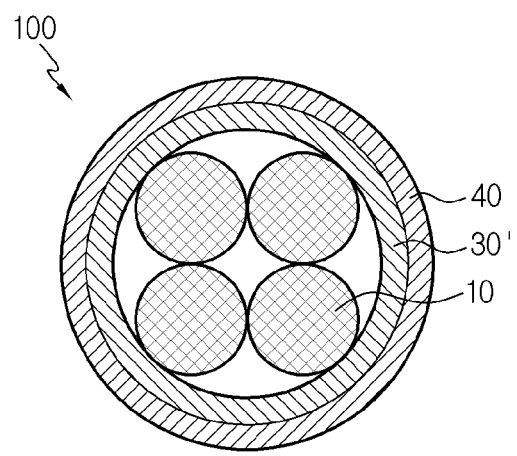
FIG. 2 is a sectional view illustrating the sectional surface of the cable-type secondary battery according to another embodiment of the present disclosure.

More particularly, the cable-type battery according to the present disclosure will be explained with reference to the accompanying drawings. FIG. 1 shows the sectional surface of the cable-type secondary battery according to an embodiment of the present disclosure. The cable-type secondary battery as shown in FIG. 1 is provided with an electrode assembly including at least one inner electrode 10, a separation layer 20 formed to surround the outer surface of the inner electrode and configured to prevent a short of the electrodes, and a sheet-type outer electrode 30 surrounding the separation layer 20 and formed by spiral winding; and a polymer electrolyte coating layer 40 configured to surround the outer part of the sheet-type outer electrode. FIG. 2 shows the sectional surface of the cable-type secondary battery according to another embodiment of the present disclosure. The cable-type secondary battery as shown in FIG. 2 has a structure in which a material functioning as a separation layer is stacked on the outer electrode as mentioned above, and is provided with an electrode assembly including at least one inner electrode 10', an outer electrode 30' which is a sheet-type separation layer-outer electrode complex configured to surround the outer surface of the inner electrode and formed by spiral winding, and a polymer electrolyte coating layer 40 configured to surround the outer part of the electrode assembly.

The polymer used for the polymer electrolyte coating layer may include a polar linear polymer, oxide-based linear polymer or a mixture thereof.

Herein, the polar linear polymer may be any one selected from the group consisting of polyimide, polyacrylonitrile, polyvinyl chloride, polyvinylidene fluoride (PVDF), polyvinylidene fluoride-co-hexafluoropropylene, polyvinylidene fluoride-co-trichloroethylene, polyethylene imine, polymethyl methacrylate, polybutyl acrylate, polyvinylpyrrolidone, polyvinylacetate, polyethylene-co-vinyl acetate, polyarylate, polyurethane and poly-p-phenylene terephthalamide, or a combination thereof.

Particularly, in the case of polyvinylidene fluoride-co-hexafluoro propylene (PVDF-HFP), it is possible to further improve the absorption of an electrode when the substitution ratio of HFP is 5-20 mol %. In addition, the oxide-based linear polymer may be any one selected from the group consisting of polyethylene oxide, polypropylene oxide, polyoxymethylene and polydimethylsiloxane, or a combination thereof.

The polymer electrolyte coating layer may be impregnated with the electrolyte, like a polymer electrolyte, so that it may have conductivity.

Herein, the polymer electrolyte coating layer allows encapsulation of the outer surface of the electrode assembly at a low temperature, such as 10-60° C., by using a material, such as acetone or acrylonitrile, having high vapor pressure and evaporating rapidly, as a solvent.

According to a preferred embodiment of the present disclosure, the polymer electrolyte layer may have a thickness of 1-100 μm.

Figure 3:
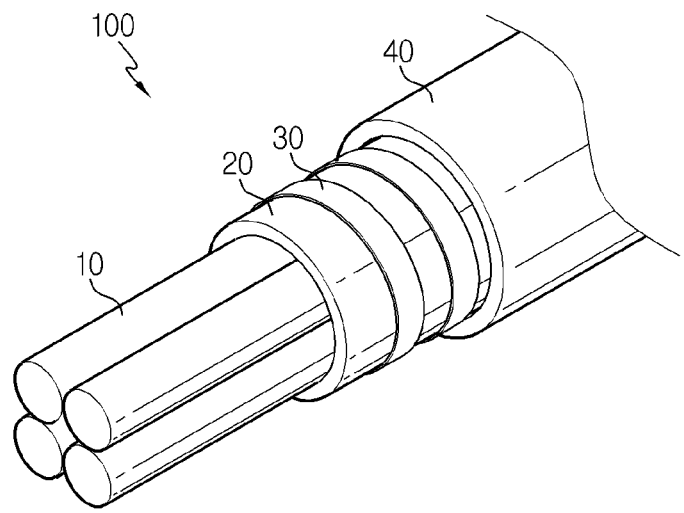
FIG. 3 is a perspective view illustrating the cable-type secondary battery according to an embodiment of the present disclosure schematically.
Figure 4:
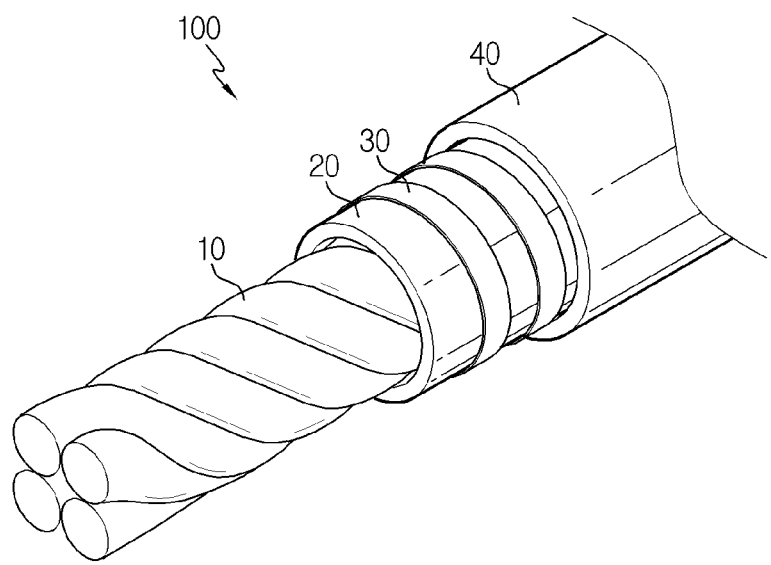
FIG. 4 is a perspective view illustrating the cable-type secondary battery according to another embodiment of the present disclosure schematically.

In addition, at least one inner electrode may be used. Thus, one inner electrode may be used alone or at least two wire-type inner electrodes may be packed in contact with each other. According to an embodiment, a plurality of wire-type inner electrodes 10 may be disposed in contact with each other and in parallel with each other as shown in FIG. 3, or a plurality of wire-type inner electrodes 10 may be disposed and twisted with each other as shown in FIG. 4.

The twisted configuration is not limited to a particular twisted configuration. However, many strands of electrodes may be disposed in parallel with each other and then twisted together. Otherwise, many strands of electrodes may be disposed so that one strand crosses with another strand to provide a twisted configuration like braided long hair.

As described above, since the inner electrodes have a close packed configuration, it is possible to reduce the inner diameter of the cable-type battery according to the present disclosure.

The inner electrode includes an inner current collector and an inner electrode active material layer. The inner current collector may include at least one spirally wound wire-type inner current collector or at least two wire-type inner current collectors wound spirally while crossing with each other. In addition, the inner electrode active material layer may be formed on the whole surface of the inner current collector, or may be formed to surround the outer surface of the wound inner current collector. More particularly, with reference to a configuration in which the inner electrode active material layer is formed on the whole surface of the wire-type inner current collector, one wire-type inner electrode having an inner electrode active material layer formed on the surface of the wire-type inner current collector may be provided. In addition, at least two inner electrodes having at least two wire-type inner current collectors in which an inner electrode active material layer is formed on the surface thereof may be wound while crossing with each other. When at least two wire-type inner electrodes are wound together, it is possible to improve the rate characteristics of a battery desirably.

Additionally, with reference to a configuration in which the inner electrode active material layer is formed to surround the outer surface of the wound inner current collector, it is possible to allow the inner electrode active material layer to surround the outer surface of the wound inner current collector after winding the inner current collector.

In addition, the inner electrode may further include a polymer support layer formed on the surface of the inner electrode active material layer.

When the polymer support layer is formed on the surface of the inner electrode active material layer of the inner electrode according to an embodiment of the present disclosure, generation of cracking on the surface of the inner electrode active material is prevented significantly, even when the cable-type secondary battery is bent by external force, etc. Thus, separation of the inner electrode active material layer is prevented significantly, thereby providing a battery with more improved quality. Further, the polymer support layer may have a porous structure. In this case, it is possible to facilitate injection of an electrolyte to the inner electrode active material layer and to prevent an increase in resistance of the electrode.

Herein, the polymer support layer may include a polar linear polymer, oxide-based linear polymer or a mixture thereof.

Herein, the polar linear polymer may be any one selected from the group consisting of polyimide, polyacrylonitrile, polyvinyl chloride, polyvinylidene fluoride (PVDF), polyvinylidene fluoride-co-hexafluoro propylene, polyvinylidene fluoride-co-trichloroethylene, polyethylene imine, polymethyl methacrylate, polybutyl acrylate, polyvinylpyrrolidone, polyvinylacetate, polyethylene-co-vinyl acetate, polyarylate, polyurethane and poly-p-phenylene terephthalamide, or a combination thereof.

In addition, the oxide-based linear polymer may be any one selected from the group consisting of polyethylene oxide, polypropylene oxide, polyoxymethylene and polydimethylsiloxane, or a combination thereof.

In addition, the polymer support layer may be a porous polymer layer having a pore size of 0.01-10 μm and a porosity of 5-95%.

Further, the porous structure of the porous polymer layer may be formed through phase transition or phase separation using a non-solvent.

For example, a polymer, polyvinylidene fluoride-hexafluoropropylene, is added to acetone functioning as a solvent to provide a solution having a solid content of 10 wt %. Then, water or ethanol as a non-solvent is added to the above solution in an amount of 2-10 wt % to obtain a polymer solution.

While the polymer evaporates after its coating, phase transition occurs so that the region occupied by the non-solvent becomes pores in the phase separated parts of the non-solvent and the polymer. Therefore, it is possible to control the pore size according to the solubility of the non-solvent and polymer and the content of the non-solvent.

Figure 5:
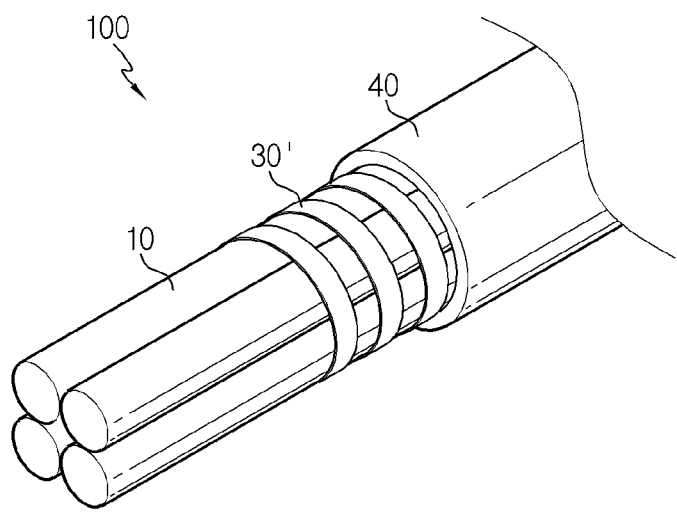
FIG. 5 is a perspective view illustrating the cable-type secondary battery according to still another embodiment of the present disclosure schematically.

In addition, the outer electrode is a sheet-type electrode, and is wound spirally while it surrounds the separation layer or the inner electrode as shown in FIG. 3-FIG. 5.

In the case of the conventional wire-type outer electrode, since the active material layer is formed through dip coating, cracking may occur on the surface of the outer electrode active material layer although the shape of the electrode is protected by a protective coating under an external bending/distortion condition, resulting in degradation of the flexibility of the electrode. Thus, according to the present disclosure, a sheet-type outer electrode formed to surround the outer surface of the separation layer or inner electrode by spiral winding is introduced.

According to an embodiment of the present disclosure, the sheet-type outer electrode may be a spirally wound sheet-type outer electrode 30 which surrounds the separation layer 20 as shown in FIG. 3 and FIG. 4. In the case of an integrated structure formed by combination of a configuration functioning as a separation layer preventing a short of the electrodes with a configuration functioning as an electrode according to another embodiment of the present disclosure, the outer electrode may be a sheet-type outer electrode 30' which is a separation layer-outer electrode complex surrounding the outer surface of the inner electrode 10 and formed by spiral winding as shown in FIG. 5.

Herein, the term 'spiral' may be interchanged with 'helix', means a shape which winds diagonally in a certain range, and generally refers to a shape similar to the shape of a general spring.

The outer electrode may have a strip structure extended in one direction.

Additionally, the outer electrode may be formed by spiral winding so as to avoid an overlap. Herein, the outer electrode may be formed by spiral winding with an interval of at most two times of the width of the outer electrode so as to avoid an overlap, thereby preventing degradation of the quality of a battery.

According to the present disclosure, the polymer electrolyte layer is present outside of the first support layer of the outer electrode but is wound so as to avoid an overlap in the sheet-type outer electrode. Thus, the polymer electrolyte layer is also formed in the gap (void) of the spirally wound electrode so that it may be connected with the separation layer. As a result, it is possible to transport the electrolyte to the inner electrode.

In addition, the polymer electrolyte layer also functions to integrate the sheet-type outer electrode with the separation layer and to make a close contact therebetween so that the separation layer and the outer electrode may not be spaced or separated from each other. Thus, it is possible to provide an effect of improving stability by preventing a short between the inner electrode and the outer electrode. Herein, the outer electrode may include an outer current collector and an outer electrode active material layer formed on one surface of the outer current collector. Particularly, the outer current collector may be a mesh-type current collector.

The outer electrode may further include a first support layer formed on the other surface of the outer current collector, wherein the first support layer may be a polymer film. The first support layer inhibits disconnection of the current collector, thereby improving the flexibility of the current collector significantly.

FIG. 6-FIG. 9 are sectional views illustrating the sectional surfaces of outer electrodes schematically.

Figure 6:
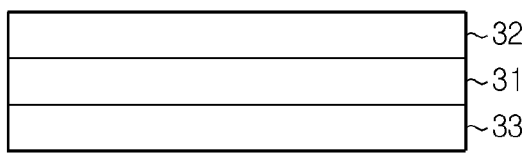
FIG. 6 shows the sectional surface of the sheet-type outer electrode according to an embodiment of the present disclosure.

As shown in FIG. 6, the outer electrode includes an outer current collector 31, an outer electrode active material layer 32 formed on one surface of the outer current collector 31, and a first support layer 33 formed on the other surface of the outer current collector 31. Herein, the first support layer 33 inhibits disconnection of the outer current collector 31, thereby improving the flexibility of the current collector 31 significantly.

Figure 7:
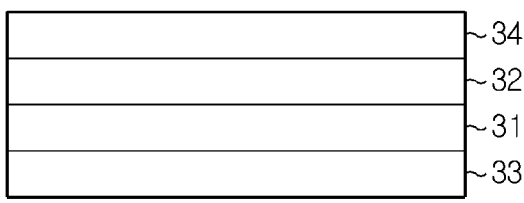
FIG. 7 shows the sectional surface of the sheet-type outer electrode according to another embodiment of the present disclosure.

In addition, as shown in FIG. 7, the outer electrode according to an embodiment of the present disclosure may further include a porous second support layer 34 formed on the outer electrode active material layer 32.

The porous second support layer 34 has a cushioning function by which external force applied to the outer electrode active material layer 32 is alleviated, even when external force such as bending or distortion is applied to the electrode. In this manner, it is possible to prevent separation of the electrode active material layer 32, thereby improving flexibility of the electrode. In addition, the porous second support layer has a porous structure to facilitate injection of an electrolyte to the electrode active material layer. Preferably, the second support layer itself may be impregnated well with an electrolyte to ensure conductivity, thereby preventing an increase in internal resistance of a battery and degradation of the quality of a battery.

Figure 8:
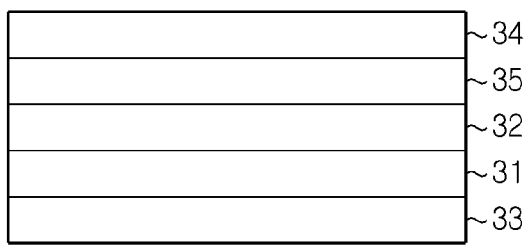
FIG. 8 shows the sectional surface of the sheet-type outer electrode according to still another embodiment of the present disclosure.

Additionally, as shown in FIG. 8, the outer electrode may further include a conductive material coating layer 35 containing a conductive material and a binder between the outer electrode active material layer 32 and the second support layer 34. In this case, it is possible to improve the conductivity of the electrode active material layer and to reduce the resistance of the electrode, thereby preventing degradation of the quality of a battery. The conductive material coating layer may be formed not only between the outer electrode active material layer 32 and the second support layer 34 but also on the second support layer 34.

Figure 9:
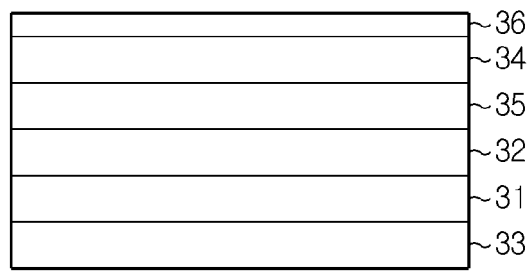
FIG. 9 shows the sectional surface of the sheet-type outer electrode according to yet another embodiment of the present disclosure.

In addition, as shown in FIG. 9, the outer electrode may further include a porous coating layer 36 formed on the second support layer 34 and including a mixture of inorganic particles and a binder polymer.

Additionally, in the organic/inorganic porous coating layer 36 including a mixture of inorganic particles and a binder polymer, the inorganic particles are bound with each other while they are in contact with each other in a packed state. Thus, interstitial volumes are formed among the inorganic particles and the interstitial volumes among the inorganic particles become vacant spaces, thereby forming pores.

In other words, the binder polymer attaches the inorganic particles to each other so that they may maintain an interconnected state. For example, the binder polymer connects and fixes the inorganic particles to each other. In addition, the pores of the porous coating layer are those formed by conversion of the interstitial volumes among the inorganic particles into vacant spaces. Such spaces are defined by the inorganic particles that are in contact with each other substantially in a closed packed or densely packed structure of the inorganic particles.

The organic/inorganic porous coating layer may be formed by mixing the inorganic particles with the binder polymer at a weight ratio of 20:80-95:5.

Herein, the inorganic particles in the organic/inorganic porous coating layer may be inorganic particles having a dielectric constant of 5 or more, inorganic particles having lithium ion transportability or a combination thereof. Herein, the inorganic particles having a dielectric constant of 5 or more may be any one selected from the group consisting of $BaTiO_3$, $Pb(Zr_x, Ti_{1-x})O_3$ (PZT, wherein $0<x<1$), $Pb_{1-x}La_xZr_{1-y}Ti_yO_3$ (PLZT, wherein $0<x<1$ and $0<y<1$), $(1-x)Pb(Mg_{1/3}Nb_{2/3})O_3-xPbTiO_3$ (PMN-PT, wherein $0<x<1$), hafnia ($HfO_2$), $SrTiO_3$, $SnO_2$, $CeO_2$, MgO, NiO, CaO, ZnO, $ZrO_2$, $Y_2O_3$, $Al_2O_3$, SiC, $SiO_2$, AlOOH, $Al(OH)_3$ and $TiO_2$, or a combination thereof. In addition, the inorganic particles having lithium ion transportability may be any one selected from the group consisting of lithium phosphate ($Li_3PO_4$), lithium titanium phosphate ($Li_xTi_y(PO_4)_3$, $0<x<2$, $0<y<3$), lithium aluminum titanium phosphate ($Li_xAl_yTi_z(PO_4)_3$, $0<x<2$, $0<y<1$, $0<z<3$), $(LiAlTiP)_xO_y$-based glass ($0<x<4$, $0<y<13$), lithium lanthanum titanate ($Li_xLa_yTiO_3$, $0<x<2$, $0<y<3$), lithium germanium thiophosphate ($Li_xGe_yP_zS_w$, $0<x<4$, $0<y<1$, $0<z<1$, $0<w<5$), lithium nitride ($Li_xN_y$, $0<x<4$, $0<y<2$), $SiS_2$ ($Li_xSi_yS_z$, 0<x<3, 0<y<2, 0<z<4)-based glass and $P_2S_5$ ($Li_xP_yS_z$, 0<x<3, 0<y<3, 0<z<7)-based glass, or a combination thereof.

In addition, the inorganic particles in the organic/inorganic porous coating layer may have an average particle diameter of 10 nm-5 μm.

Meanwhile, the binder polymer in the organic/inorganic porous coating layer may be any one selected from the group consisting of polyvinylidene fluoride (PVDF), polyvinylidene fluoride-co-hexafluoropropylene, polyvinylidene fluoride-co-trichloroethylene, polybutyl acrylate, polymethyl methacrylate, polyacrylonitrile, polyvinylpyrrolidone, polyvinylacetate, polyethylene-co-vinyl acetate, polyethylene oxide, polyarylate, cellulose acetate, cellulose acetate butyrate, cellulose acetate propionate, cyanoethylpullulan, cyanoethylpolyvinylalcohol, cyanoethylcellulose, cyanoethylsucrose, pullulan, carboxymethyl cellulose, styrene-butadiene rubber, acrylonitrile-styrene-butadiene copolymer and polyimide, or a combination thereof, but is not limited thereto.

Figure 10:
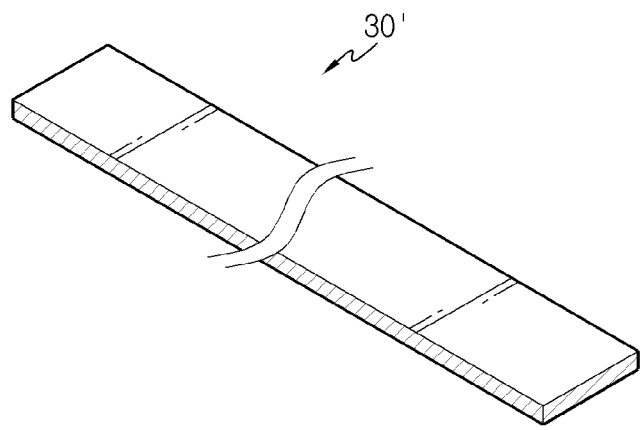
FIG. 10 shows the lateral surface corresponding to the height of the sheet-type outer electrode according to an embodiment of the present disclosure, wherein the lateral surface is marked by diagonal lines.

Particularly, when the separation layer and the outer electrode are integrated with each other, the outer electrode 30' according to a preferred embodiment may be further surrounded with a polymer layer causing no electrochemical reaction on the four lateral surfaces corresponding to the height of the sheet-type outer electrode, as shown in the portion marked by diagonal lines in FIG. 10 (only the two front side surfaces are marked by diagonal lines and the two back side surfaces are not marked). In such a polymer layer, the four surfaces corresponding to the height of the sheet-type outer electrode are encapsulated. Thus, it is possible to prevent an internal short by surrounding the current collector layer that may be exposed to the surfaces corresponding to the height of the sheet with an insulating material.

The polymer causing no electrochemical reaction may include polyvinylidene fluoride (PVdF), polyvinylidene fluoride-co-hexafluoropropylene (PVdF-HFP), polyacrylate, polyamide, polyimide, polyolefin (e.g. polyethylene (PE), polypropylene (PP), polytetrafluoroethylene (PTFE), polyurethane, polyester (such as polyethylene terephthalate (PET)), polyethylene oxide (PEO), polyethylene imine (PEI), styrene butadiene rubber (SBR), or the like, and most preferably polyacrylate, polyamide, polyimide, polyvinylidene fluoride (PVdF), polyvinylidene fluoride-co-hexafluoropropylene (PVdF-HFP), polyethylene oxide (PEO), styrene butadiene rubber (SBR), or the like, but is not limited thereto.

According to a method for manufacturing the sheet-type outer electrode according to a first embodiment, first of all, electrode active material slurry is applied on one surface of the current collector. Herein, the first support layer may be formed on the other surface of the current collector in advance by compression, or the first support layer may be formed by compression on the other surface of the current collector after applying the slurry of the electrode active material. Herein, the first support layer inhibits disconnection of the current collector, thereby further improving the flexibility of the current collector (S1).

Herein, the current collector functions to collect the electrons generated by the electrochemical reaction of an electrode active material or to supply the electrons required for electrochemical reaction. The current collector may be formed of stainless steel, aluminum, nickel, titanium, baked carbon, or copper; stainless steel surface-treated with carbon, nickel, titanium or silver; aluminum-cadmium alloy; a non-conductive polymer surface-treated with a conductive material; a conductive polymer; metal paste including metal powder which is Ni, Al, Au, Pd/Ag, Cr, Ta, Cu, Ba or ITO; or carbon paste containing carbon powder which is graphite, carbon black or a carbon nanotube.

As described above, when external force, such as bending or distortion, is applied to a secondary battery, the electrode active material layer may be separated from the current collector. Therefore, a large amount of binder ingredients is incorporated to the electrode active material layer for the purpose of the flexibility of the electrode. However, such a large amount of binder causes swelling in the presence of an electrolyte and thus may be separated from the current collector with ease, resulting in degradation of the quality of a battery.

Therefore, the current collector may further include a primer coating layer containing a conductive material and a binder in order to improve the adhesion between the electrode active material layer and the current collector. The conductive material and the binder used herein may be the same as those used for forming the conductive material coating layer as described hereinafter.

In addition, the current collector may be a mesh-type current collector and may further have a plurality of intrusions on at least one surface in order to increase the surface area of the current collector. Herein, the intrusions may have a continuous patter or a discontinuous pattern. In other words, the current collector may have a continuous pattern of intrusions spaced apart from each other and formed in the longitudinal direction, or a discontinuous pattern of a plurality of holes. The holes may be circular or polygonal holes.

Then, optionally, a porous second support layer may be formed on the electrode active material slurry (S2). Herein, the second support layer may be a mesh-type porous membrane or nonwoven web. Such a porous structure facilitates injection of an electrolyte to the electrode active material layer. In addition, the second support layer itself may be impregnated well with an electrolyte to ensure ion conductivity, thereby preventing an increase in internal resistance of a battery and degradation of the quality of a battery.

Each of the first support layer and the second support layer may be independently formed of any one selected from the group consisting of high density polyethylene, low density polyethylene, linear low density polyethylene, ultra-high molecular weight polyethylene, polypropylene, polyethylene terephthalate, polyester, polyacetal, polyamide, polycarbonate, polyimide, polyetheretherketone, polyether sulfone, polyphenylene oxide, polyphenylene sulfide and polyethylene naphthalate, or a mixture thereof.

Meanwhile, a conductive material coating layer containing a conductive material and a binder may be further provided on the second support layer. The conductive material coating layer improves the conductivity of the electrode active material layer and reduces the resistance of the electrode, thereby preventing degradation of the quality of a battery.

In the case of an anode, the anode active material layer has relatively high conductivity, and thus the battery shows quality similar to that of a battery using a conventional anode, even in the absence of the conductive material layer. However, in the case of the cathode, the cathode active material layer has low conductivity and degradation of the quality may become severe due to an increase in resistance of the electrode. Therefore, it is advisable to apply the conductive material layer to a cathode in order to reduce the internal resistance of the battery.

Herein, the conductive material coating layer may include the conductive material and the binder mixed with each other at a weight ratio of 80:20-99:1. When the content of the binder increases, the resistance of the electrode may be increased excessively. However, when the content satisfies the above-defined range, it is possible to prevent an excessive increase in resistance of the electrode. Further, as described above, the first support layer has a cushioning function to prevent separation of the electrode active material layer. Thus, even when a relatively small amount of binder is used, the flexibility of the electrode is ensured without significant interruption.

Herein, the conductive material may include any one selected from the group consisting of carbon black, acetylene black, ketjen black, carbon fibers, carbon nanotubes and graphene, or a combination thereof, but is not limited thereto.

In addition, the binder may be any one selected from the group consisting of polyvinylidene fluoride (PVDF), polyvinylidene fluoride-co-hexafluoropropylene, polyvinylidene fluoride-co-trichloroethylene, polybutyl acrylate, polymethyl methacrylate, polyacrylonitrile, polyvinylpyrrolidone, polyvinylacetate, polyethylene-co-vinyl acetate, polyethylene oxide, polyarylate, cellulose acetate, cellulose acetate butyrate, cellulose acetate propionate, cyanoethylpullulan, cyanoethylpolyvinylalcohol, cyanoethylcellulose, cyanoethylsucrose, pullulan, carboxymethyl cellulose, styrene-butadiene rubber, acrylonitrile-styrene-butadiene copolymer and polyimide, or a combination thereof, but is not limited thereto.

Then, the resultant product obtained from step (S1) or (S2) is compressed and adhered to the current collector to form an integrated electrode active material layer (S3). Meanwhile, when the electrode active material slurry is coated onto one surface of the current collector and dried to form the electrode active material layer, and then the second support layer is formed through lamination, or the like, the binder ingredient of the slurry of electrode active material which allows the electrode active material layer and the second support layer to be adhered to each other may be cured so that strong adhesion may not be retained between the two layers.

In addition, it is possible to form a porous support layer by coating a polymer solution onto the electrode active material layer, while not using a preliminarily formed porous second support layer similarly to the above-described method. However, the porous support formed by coating of the polymer solution has lower mechanical properties as compared to the porous second support layer obtained by the preferred method according to the present disclosure, and thus cannot effectively inhibit separation of the electrode active material layer caused by external force.

However, according to the preferred method of the present disclosure, the second support layer is formed on the top surface of the slurry of electrode active material before the binder ingredient is cured and applied together through a coating blade. Thus, it is possible to form an electrode active material layer adhered and integrated between the current collector and the first support layer.

In addition, the separation layer is configured to prevent a short of the electrodes and is formed to surround the outer surface of the inner electrodes.

The separation layer according to the present disclosure may include an electrolyte layer or separator.

The electrolyte layer functioning as an ion path may include a gel type polymer electrolyte using PEO, PVdF, PVdF-HFP, PMMA, PAN or PVAc; or a solid electrolyte using PEO, polypropylene oxide (PPO), polyethylene imine (PEI), polyethylene sulfide (PES) or polyvinyl acetate (PVAc); or the like. Preferably, the matrix for the solid electrolyte includes a polymer or ceramic glass as a fundamental skeleton. In the case of a general polymer electrolyte, ions may be transported very slowly in terms of reaction rate even though the ion conductivity is satisfied. Thus, it is preferred to use a gel type polymer electrolyte facilitating ion transport rather than a solid electrolyte. Such a gel type polymer electrolyte does not have good mechanical properties and thus may include a support in order to supplement mechanical properties. The support used herein may include a porous support or crosslinked polymer. The electrolyte layer according to the present disclosure also functions as a separator, and thus use of an additional separator may be avoided.

The electrolyte layer according to the present disclosure may further include a lithium salt. Such a lithium salt can improve ion conductivity and reaction rate. Non-limiting examples of the lithium salt may include LiCl, LiBr, LiI, LiClO$_4$, LiBF$_4$, LiB$_{10}$Cl$_{10}$, LiPF$_6$, LiCF$_3$SO$_3$, LiCF$_3$CO$_2$, LiAsF$_6$, LiSbF$_6$, LiAlCl$_4$, CH$_3$SO$_3$Li, CF$_3$SO$_3$Li, (CF$_3$SO$_2$)$_2$NLi, chloroborane lithium, lower aliphatic lithium carboxylate and lithium tetraphenylborate.

Although there is no particular limitation, the separator may be a porous polymer substrate made of a polyolefin polymer selected from the group consisting of an ethylene homopolymer, propylene homopolymer, ethylene-butene copolymer, ethylene-hexene copolymer and ethylene-methacrylate copolymer; a porous polymer substrate made of a polymer selected from the group consisting of polyester, polyacetal, polyamide, polycarbonate, polyimide, polyetherether ketone, polyether sulfone, polyphenylene oxide, polyphenylene sulfide and polyethylene naphthalate; a porous substrate formed of a mixture of inorganic particles and a binder polymer; or a separator provided with a porous coating layer formed of a mixture of inorganic particles and a binder polymer on at least one surface of the porous polymer substrate.

Herein, in the porous coating layer formed of a mixture of inorganic particles and a binder, the inorganic particles are bound to each other by the binder polymer while there are in contact with each other, thereby forming interstitial volumes among the inorganic particles. In addition, the interstitial volumes become vacant spaces to form pores. In other words, the binder polymer connects and fixes the inorganic particles to each other. In addition, the pores of the porous coating layer are those formed by conversion of the interstitial volumes among the inorganic particles into vacant spaces. Such spaces are defined by the inorganic particles that are in contact with each other substantially.

According to still another embodiment of the present disclosure, the separator may be a foam separator impregnated with a liquid electrolyte.

The foam separator may be formed by mixing a foaming agent with a liquid phase of polymer material forming the above-mentioned porous substrate to prepare a coating solution, and applying the coating solution to the outer surface of the inner electrode, followed by drying and foaming The foaming agent may be at least one selected from the group consisting of azo (—N=N—)-based compounds, carbonate-based compounds, hydrazide-based compounds, nitrile-based compounds, amine-based compounds, amide-based compounds and carbazide-based compounds.

The foam separator has interconnected micropores with a size of 30-200 nm by mixing a foaming agent homogeneously before foaming, and a liquid electrolyte can be injected to the foam separator according to a capillary effect of the pores. In other words, when the electrolyte is absorbed to the separator, it becomes a system in which the electrolyte is injected along the pores under cohesive force and surface tension. As a result, it is possible to further expedite injection of an electrolyte to the inner electrode in a cable-type secondary battery having a minimized inner diameter.

In addition, since the sheet-type outer electrode is wound without any overlap as described above, the polymer electrolyte layer and the separation layer may be connected with each other through the gaps of winding. Thus, lithium ions can be transported smoothly from the inner electrode to the outer electrode and the polymer electrolyte layer, thereby improving the capacity characteristics and cycle characteristics of a battery.

The cable-type secondary battery according to an embodiment of the present disclosure has a predetermined shape of horizontal section and may have a liner structure elongated along the longitudinal direction to the horizontal section. The cable-type secondary battery according to an embodiment of the present disclosure may have flexibility and may be deformed freely. Herein, 'predetermined shape' refers to any shape without particular limitation. Thus, any shape may be used within the scope of the present disclosure.

According to the present disclosure, the inner electrode may be an anode or cathode and the outer electrode may be a cathode or anode corresponding to the inner electrode.

When the inner electrode is an anode and the outer electrode is a cathode, the inner electrode active material may include any one active material particle selected from the group consisting of carbonaceous materials, such as natural graphite and artificial graphite; metals (Me), such as lithium-containing titanium composite oxide (LTO), Si, Sn, Li, Zn, Mg, Cd, Ce, Ni or Fe; alloys of the metals (Me); oxides (MeOx) of the metals (Me); and composites of the metals with carbon, or a mixture thereof. The outer electrode active material may be any one active material particle selected from the group consisting of $LiCoO_2$, $LiNiO_2$, $LiMn_2O_4$, $LiCoPO_4$, $LiFePO_4$ and $LiNi_{1-x-y-z}Co_xM1_yM2_zO_2$ (wherein each of M1 and M2 independently represents any one selected from the group consisting of Al, Ni, Co, Fe, Mn, V, Cr, Ti, W, Ta, Mg and Mo, each of x, y and z independently represents an atomic proportion of an element forming the oxides, and $0 \leq x \leq 0.5$, $0 \leq y \leq 0.5$, $0 \leq z < 0.5$, $0 < x+y+z \leq 1$), or a mixture thereof.

In addition, when the inner electrode is a cathode and the outer electrode is an anode, the inner electrode active material may be any one active material particle selected from the group consisting of $LiCoO_2$, $LiNiO_2$, $LiMn_2O_4$, $LiCoPO_4$, $LiFePO_4$ and $LiNi_{1-x-y-z}Co_xM1_yM2_zO_2$ (wherein each of M1 and M2 independently represents any one selected from the group consisting of Al, Ni, Co, Fe, Mn, V, Cr, Ti, W, Ta, Mg and Mo, each of x, y and z independently represents an atomic proportion of an element forming the oxides, and $0 \leq x < 0.5$, $0 \leq y < 0.5$, $0 \leq z < 0.5$, $0 \leq x+y+z \leq 1$), or a mixture thereof. The inner electrode active material may include any one active material particle selected from the group consisting of carbonaceous materials, such as natural graphite and artificial graphite; metals (Me), such as lithium-containing titanium composite oxide (LTO), Si, Sn, Li, Zn, Mg, Cd, Ce, Ni or Fe; alloys of the metals (Me); oxides (MeOx) of the metals (Me); and composites of the metals with carbon, or a mixture thereof.

The electrode active material layer serves to transport ions through the current collector, and such ion transport is caused by the interaction through the intercalation of ions from the electrolyte layer and deintercalation of ions to the electrolyte layer. The electrode active material layer may be classified into an anode active material layer and a cathode active material layer.

The electrode active material layer includes an electrode active material, binder and a conductive material, and is coupled with a current collector to form an electrode. When the electrode is deformed, for example, folded or bent severely by external force, separation of the electrode active material may occur. Separation of the electrode active material causes degradation of the quality and capacity of a battery. However, since the spirally wound sheet-type outer current collector has elasticity, it functions to disperse force during the deformation caused by the external force. Thus, the electrode active material layer is less deformed, thereby preventing separation of the active material.

Figure 11:
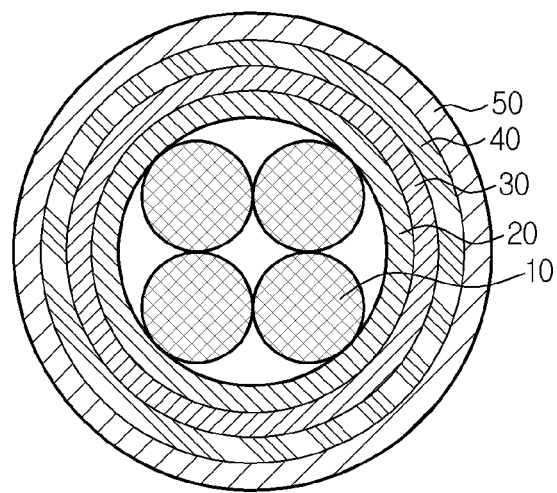
FIG. 11 is a sectional view illustrating the sectional surface of the cable-type secondary battery according to an embodiment of the present disclosure.
Figure 12:
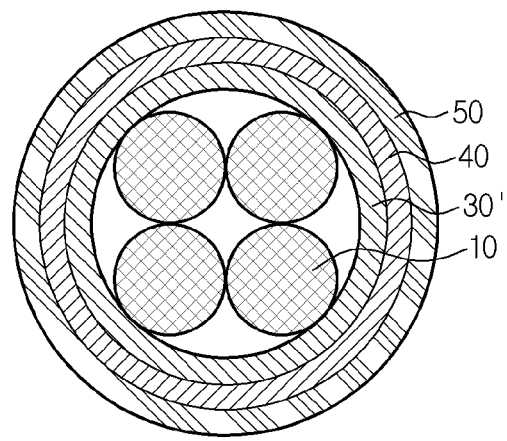
FIG. 12 is a sectional view illustrating the sectional surface of the cable-type secondary battery according to another embodiment of the present disclosure.

According to an embodiment of the cable-type secondary battery of the present disclosure, the battery may further include a protective coating 50. Referring to FIG. 11 and FIG. 12, the protective coating is an insulating material and is formed on the outermost surface in order to protect the electrode from moisture in air and external impact. As the protective coating, a conventional polymer resin including a moisture barrier layer may be used. Herein, aluminum or a liquid crystal polymer (LCP) having excellent moisture barrier property may be used as the moisture barrier layer, and PET, PVC, HDPE or epoxy resin may be used as the polymer resin.

More particularly, FIG. 11 shows a sectional view of the cable-type secondary battery according to an embodiment. The cable-type secondary battery may include an electrode assembly including at least one wire-type inner electrode 10, a separation layer 20 formed to surround the outer surface of the inner electrode and configured to prevent a short of the electrodes, and a sheet-type outer electrode 30 formed to surround the separation layer by spiral winding; a polymer electrolyte coating layer 40 formed to surround the electrode assembly; and a protective coating 50 surround the outer surface of the polymer electrolyte coating layer.

FIG. 12 shows a sectional view of the cable-type secondary battery according to another embodiment. The cable-type secondary battery may include an electrode assembly including at least one wire-type inner electrode 10, and a sheet-type outer electrode 30' as a complex also functioning as a separation layer formed to surround the outer surface of the inner electrode by winding; a polymer electrolyte coating layer 40 formed to surround the electrode assembly; and a protective coating 50 surrounding the outer surface of the polymer electrolyte coating layer.

The cable-type secondary battery according to an embodiment of the present disclosure may have a diameter of 1.5 mm or less, particularly 0.5-1.5 mm, and more particularly 0.5-1.3 mm.

Hereinafter, the method for manufacturing a cable-type secondary battery according to an embodiment of the present disclosure will be explained in detail.

First, wire-type inner current collectors having an inner electrode active material layer on the surface thereof are closely packed to provide packed inner electrodes.

Methods for forming an inner electrode active material layer on the surface of the wire-type inner current collector may be conventional coating methods. Particularly, electroplating or anodic oxidation processes may be used. However, it is preferred to carry out coating of electrode slurry containing an active material by using a comma coater or slot die coater. In addition, in the case of electrode slurry containing an active material, it is possible to use a dip coating process or an extrusion coating process utilizing an extruder.

Next, a separation layer sheet configured to prevent a short of the electrodes is formed on the outer surface of the inner electrode by winding the sheet so that a half of sheet may be overlapped. If the sheet-type outer electrode also functions as a separation layer, the step of winding a separation layer sheet may be omitted.

Then, a sheet-type outer electrode is formed.

According to an embodiment, it is possible to manufacture a sheet-type outer electrode by carrying out the steps of: (S1) forming a first support layer on one surface of a sheet-type outer current collector through compression; and (S2) applying outer electrode active material slurry onto the other surface of the outer current collector and drying the active material slurry to form an outer electrode active material layer.

According to another embodiment of the present disclosure, it is possible to manufacture a sheet-type outer electrode by carrying out the steps of: (S1) forming a first support layer on one surface of a sheet-type outer current collector through compression; (S2) applying outer electrode active material slurry onto the other surface of the outer current collector and drying the active material slurry to form an outer electrode active material layer; (S3) applying conductive material slurry containing a conductive material and a binder on the outer electrode active material layer, and forming a porous second support layer on the conductive material slurry; and (S4) compressing the resultant product of step (S3) to form an integrated conductive layer adhered between the outer electrode active material layer and the second support layer.

Then, the sheet-type outer electrode is wound on the outer surface of the separation layer or inner electrode to form an electrode assembly.

Then, a step of injecting an electrolyte is carried out by dipping the electrode assembly into an electrolyte bath. The electrolyte may be a conventional electrolyte, such as an organic electrolyte containing a lithium salt, with no particular limitation.

Then, a polymer coating layer is formed on the electrode assembly. The polymer is added to a solvent, such as acetone or acetonitrile, having high vapor pressure and evaporates rapidly to provide a solution. After that, polymer coating is carried out by using the solution at a low temperature, particularly about 10-60° C., so that the electrolyte in the electrode assembly may not be released to the exterior. Such a coating layer absorbs an electrolyte like a polymer electrolyte, and thus has ion conductivity.

Then, according to a preferred embodiment, a protective coating is formed to surround the outer surface of the polymer electrolyte coating layer. The protective coating is an insulating material and is formed on the outermost surface to protect the electrode from moisture in air and external impact. As described above, conventional polymer resins including a moisture barrier layer may be used as the protective coating.

Finally, the resultant structure is sealed completely to obtain a cable-type secondary battery.

Examples will be described more fully hereinafter so that the present disclosure can be understood with ease. The following examples may, however, be embodied in many different forms and should not be construed as limited to the exemplary embodiments set forth therein. Rather, these exemplary embodiments are provided so that the present disclosure will be thorough and complete, and will fully convey the scope of the present disclosure to those skilled in the art.

EXAMPLE 1

First, 250 μm copper (Cu) wires were mixed with a composition containing spherical graphite (16 μm), acetylene black and KF1100 (PVDF) as a binder at a ratio of 81:4:15 (weight ratio) along with N-methyl pyrrolidone (NMP) as a solvent to obtain slurry. Next, the slurry was coated by using an extrusion coater so that it might have a capacity of 3.8 mAh/cm$^2$ (thickness including Cu wires: 400 μm). Next, a binder solution containing PVdF-HFP (5 wt % of HFP based on the total weight) dissolved in acetone at a concentration of 16.8% was coated to a thickness of 10 μm, thereby providing a wire-type anode having a thickness of 410 μm.

As shown in FIG. 3, four strands of the resultant wire-type anodes were disposed, the active material was removed in a length of about 5 mm from the end portion, and a nickel (Ni) tab was connected thereto to obtain an inner electrode. Next, a separation layer sheet configured to prevent a short of the electrodes was formed by winding on the outer surface of the inner electrode so that a half of the sheet might be overlapped. If the sheet-type outer electrode also functions as a separation layer, the step of winding the separation layer will be omitted.

Then, a sheet-type outer electrode was formed.

Slurry was obtained by mixing a composition containing LiCoO$_2$, acetylene black and KF1100 (PVdF) as a binder at a ratio of 90:4:6 (weight ratio) with a solvent. The slurry was applied to the PET-free surface of foil formed by lamination of PET (12 μm) to aluminum (Al) foil (20 μm) to obtain a cathode having a capacity density of 3.3 mAh/cm$^2$. Herein, the thickness of the cathode active material layer was 63 μm. Then, slurry obtained by mixing 40% of a conductive material with 60% of KF1100 along with N-methyl pyrrolidone (NMP) as a solvent was applied thereto to a thickness of 3 μm. After that, nonwoven web (nanofibrous PET having a diameter of 180 nm, porosity 47%, air permeability 15 sec/100 mL, pore size 2 μm) having a thickness of 15 μm before drying was adhered thereto to obtain a multilayer type cathode. The multilayer type cathode was slit with a width of 3 mm to provide a sheet-type outer electrode. The sheet-type outer electrode was wound spirally on the outer surface of the separation layer or inner electrode with no overlap to form an electrode assembly. The active material was removed in about 5 mm from the end portion and an aluminum tab was connected thereto. In this manner, a battery structure having a total length of 10 cm and a capacity per unit length of 12 mAh/cm was obtained.

Then, a step of injecting an electrolyte was carried out by dipping the electrode assembly into an electrolyte bath containing EC:PC:DEC (w/w %) at a concentration of 1M LiPF$_6$. After that, a polyimide coating layer was formed on the electrode assembly. Polyimide (molecular weight 1,200,000) was added to acetonitrile to prepare a solution having a concentration of 12%. At about 23° C., a polymer electrolyte coating layer (thickness 50 μm) was formed so that the electrolyte may not be released out of the electrode assembly.

Then, a protective coating was formed to surround the outer surface of the polymer electrolyte coating layer. The protective coating is an insulating material and is formed to the outermost surface to protect the electrode from moisture in air and external impact. As the protective coating, a PET polymer resin including an aluminum layer as a moisture barrier layer was used. The thickness of the protective coating was 64 μm. After that, the resultant structure was sealed completely to provide a cable-type secondary battery.

The resultant cable-type secondary battery had a diameter of about 1.19 mm.

EXAMPLE 2

A cable-type secondary battery was obtained in the same manner as Example 1, except that the inner electrode was formed by twisting four strands wire-type anodes as shown in FIG. 4.

COMPARATIVE EXAMPLE 1

A cable-type secondary battery was obtained in the same manner as Example 1, except that the inner electrode was fabricated by disposing one strand of wire-type anode.

COMPARATIVE EXAMPLE 2

A cable-type secondary battery was obtained in the same manner as Example 1, except that the sheet-type outer electrode was fabricated without a PET layer on aluminum foil.

Evaluation of Service Life Characteristics

Figure 13:
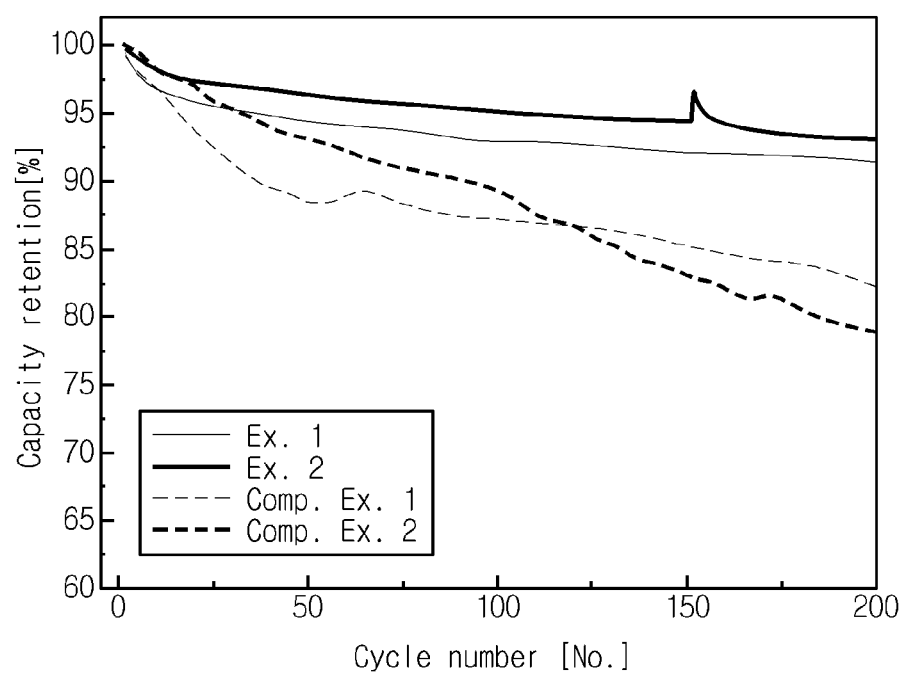
FIG. 13 is a graph illustrating the results of evaluation for the service life characteristics of the cable-type secondary batteries according to Example 1, Example 2, Comparative Example 1 and Comparative Example 2.

The service life characteristics of a battery was evaluated by connecting a cathode tab and an anode tab to a charger/discharger while the battery is bent at 15R (bend radius). Each of the cable-type secondary batteries according to Examples 1 and 2 and Comparative Examples 1 and 2 was cut off for charge capacity under a constant current/constant voltage (CC/CV) condition up to 4.2 V at 0.5C and under a CV condition at 0.05C, and then was cut off up to 3.0V at 0.5C to determine discharge capacity. This was repeated over 1-200 cycles. The capacity retention defined by the discharge capacity for each measured cycle based on the discharge capacity of the first cycle is shown in FIG. 13.

DESCRIPTION OF MAIN ELEMENTS

10: inner electrode
20: separation layer
30, 30': sheet-type outer electrode
40: polymer electrolyte coating layer
100: cable-type secondary battery
31: outer electrode current collector
32: outer electrode active material layer
33: first support layer
34: second support layer
35: conductive layer
36: organic/inorganic porous coating layer
50: protective coating

What is claimed is:

1. A cable-type secondary battery which comprises:
an inner electrode;
a separation layer formed to surround an outer surface of the inner electrode and configured to prevent a short of the inner electrode;
a sheet-type outer electrode surrounding the separation layer or the inner electrode and formed by spiral winding; and
a polymer electrolyte coating layer formed to surround the sheet-type outer electrode, the polymer electrolyte coating layer having a thickness of 1-100 μm,
wherein the polymer electrolyte coating layer is impregnated with an electrolyte, so that the polymer electrolyte coating layer has conductivity, and
wherein the outer electrode includes an outer current collector, an outer electrode active material layer formed on one surface of the outer current collector, and a first support layer formed on the other surface of the outer current collector, and the sheet-type outer electrode is formed by spiral winding to avoid an overlap.

2. The cable-type secondary battery according to claim 1, wherein the inner electrode comprises an inner current collector and an inner electrode active material layer formed on the surface of the inner current collector.

3. The cable-type secondary battery according to claim 1, wherein the sheet-type outer electrode has a strip structure extended in one direction.

4. The cable-type secondary battery according to claim 1, wherein the sheet-type outer electrode is formed by spiral winding with an interval of at most two times of the width of the sheet-type outer electrode so as to avoid an overlap.

5. The cable-type secondary battery according to claim 1, wherein the first support layer is a polymer film.

6. The cable-type secondary battery according to claim 1, wherein the outer electrode further comprises a porous second support layer formed on the outer electrode active material layer.

7. The cable-type secondary battery according to claim 6, which further comprises a conductive material coating layer comprising a conductive material and a binder and formed on the second support layer.

8. The cable-type secondary battery according to claim 7, wherein the conductive material coating layer may comprises the conductive material and the binder mixed with each other at a weight ratio of 80:20-99:1.

9. The cable-type secondary battery according to claim 6, which further comprises a porous coating layer including a mixture of inorganic particles with a binder polymer and formed on the second support layer.

10. The cable-type secondary battery according to claim 1, wherein the inner electrode is an anode or cathode, and the outer electrode is a cathode or anode corresponding to the inner electrode.

11. The cable-type secondary battery according to claim 1, which further comprises a protective coating formed to surround the outer surface of the polymer electrolyte coating layer.

12. A method for manufacturing a cable-type secondary battery, comprising the steps of:
preparing an electrode assembly comprising an inner electrode, a separation layer formed to surround an outer surface of the inner electrode and configured to prevent a short of the inner electrode, and a sheet-type outer electrode surrounding the separation layer or the inner electrode and formed by spiral winding, wherein the sheet-type outer electrode is formed by spiral winding to avoid an overlap and the inner electrode comprises at least two wire-type inner electrodes twisted with each other;
dipping the electrode assembly into an electrolyte bath to inject an electrolyte thereto; and
coating the outer part of the electrode assembly to which the electrolyte is injected with a polymer to form a polymer electrolyte coating layer, the polymer electrolyte coating layer having a thickness of 1-100 μm,
wherein the polymer electrolyte coating layer is impregnated with an electrolyte, so that the polymer electrolyte coating layer has conductivity.

13. The method for manufacturing a cable-type secondary battery according to claim 12, wherein the polymer electrolyte coating layer comprises a polar linear polymer, oxide-based linear polymer or a mixture thereof.

14. The method for manufacturing a cable-type secondary battery according to claim 13, wherein the polar linear polymer is any one selected from the group consisting of polyimide, polyacrylonitrile, polyvinyl chloride, polyvinylidene fluoride (PVDF), polyvinylidene fluoride-co-hexafluoro propylene, polyvinylidene fluoride-co-trichloroethylene, polyethylene imine, polymethyl methacrylate, polybutyl acrylate, polyvinylpyrrolidone, polyvinylacetate, polyethylene-co-vinyl acetate, polyarylate, polyurethane and poly-p-phenylene terephthalamide, or a combination thereof.

15. The method for manufacturing a cable-type secondary battery according to claim 13, wherein the oxide-based linear polymer is any one selected from the group consisting of polyethylene oxide, polypropylene oxide, polyoxymethylene and polydimethylsiloxane, or a combination thereof.

16. The cable-type secondary battery according to claim 1, wherein the electrolyte is an organic electrolyte containing a lithium salt.

17. The cable-type secondary battery according to claim 16, wherein the polymer electrolyte coating layer comprises a polar linear polymer, oxide-based linear polymer or a mixture thereof.

18. The cable-type secondary battery according to claim 17, wherein the polar linear polymer is any one selected from the group consisting of polyimide, polyacrylonitrile, polyvinyl chloride, polyvinylidene fluoride (PVDF), polyvinylidene fluoride-co-hexafluoropropylene, polyvinylidene fluoride-co-trichloroethylene, polyethylene imine, polymethyl methacrylate, polybutyl acrylate, polyvinylpyrrolidone, polyvinylacetate, polyethylene-co-vinyl acetate, polyarylate, polyurethane and poly-p-phenylene terephthalamide, or a combination thereof.

19. The cable-type secondary battery according to claim 18, wherein the oxide-based linear polymer is any one selected from the group consisting of polyethylene oxide, polypropylene oxide, polyoxymethylene and polydimethylsiloxane, or a combination thereof.

* * * * *